US007551276B2

(12) United States Patent
Holota et al.

(10) Patent No.: US 7,551,276 B2
(45) Date of Patent: Jun. 23, 2009

(54) METHOD AND APPARATUS FOR DETECTING OPTICAL SPECTRA

(75) Inventors: Wolfgang Holota, Otterlog (DE); Thido Reinert, Meckenbeuren (DE); Jean-Francois Pittet, Markdorf (DE)

(73) Assignee: Astrium GmbH, Munich (DE)

( * ) Notice: Subject to any disclaimer, the term of this patent is extended or adjusted under 35 U.S.C. 154(b) by 458 days.

(21) Appl. No.: 11/597,754

(22) PCT Filed: May 14, 2005

(86) PCT No.: PCT/DE2005/000884

§ 371 (c)(1),
(2), (4) Date: Nov. 28, 2006

(87) PCT Pub. No.: WO2005/116595

PCT Pub. Date: Dec. 8, 2005

(65) Prior Publication Data

US 2009/0009762 A1    Jan. 8, 2009

(30) Foreign Application Priority Data

May 29, 2004   (DE)   ........................ 10 2004 026 373

(51) Int. Cl.
*G01J 3/28* (2006.01)
(52) U.S. Cl. ........................... 356/328; 356/326
(58) Field of Classification Search ................ 356/319, 356/324, 326, 328
See application file for complete search history.

(56) References Cited

U.S. PATENT DOCUMENTS

| 4,192,611 | A | 3/1980 | Jones |
| 5,638,173 | A | 6/1997 | Smith et al. |
| 7,262,846 | B2 * | 8/2007 | Hagler ........................ 356/330 |
| 2003/0043373 | A1 | 3/2003 | Russell |

FOREIGN PATENT DOCUMENTS

WO    WO 89/00280 A1    1/1989

OTHER PUBLICATIONS

International Search Report dated Sep. 27, 2005, with English translation of pertinent portion, and PCT/ISA/237 (Thirteen (13) pages).

* cited by examiner

*Primary Examiner*—L. G Lauchman
(74) *Attorney, Agent, or Firm*—Crowell & Moring LLP

(57) ABSTRACT

In a method and apparatus for detecting optical spectra, two or more partial beams are generated from an incident beam, each of said partial beams being assigned to a different spectral region. The partial beams travel through a spectrometer lens system and are detected in a spatially separated manner. For this purposes, the partial beams generated from the incident beam are directed to respective spatially separated diffraction gratings that are virtually superimposed in the beam path, and are assigned to different spectral regions. After passing through the diffraction gratings, the spectrally separated partial beams are combined to a joint beam path traveling through the spectrometer lens system. Preferably, the partial beams comprising the different spectral regions can be spectrally separated after passing through the spectrometer lens system and can be detected in spatially separated detectors assigned to the different spectral regions.

11 Claims, 1 Drawing Sheet

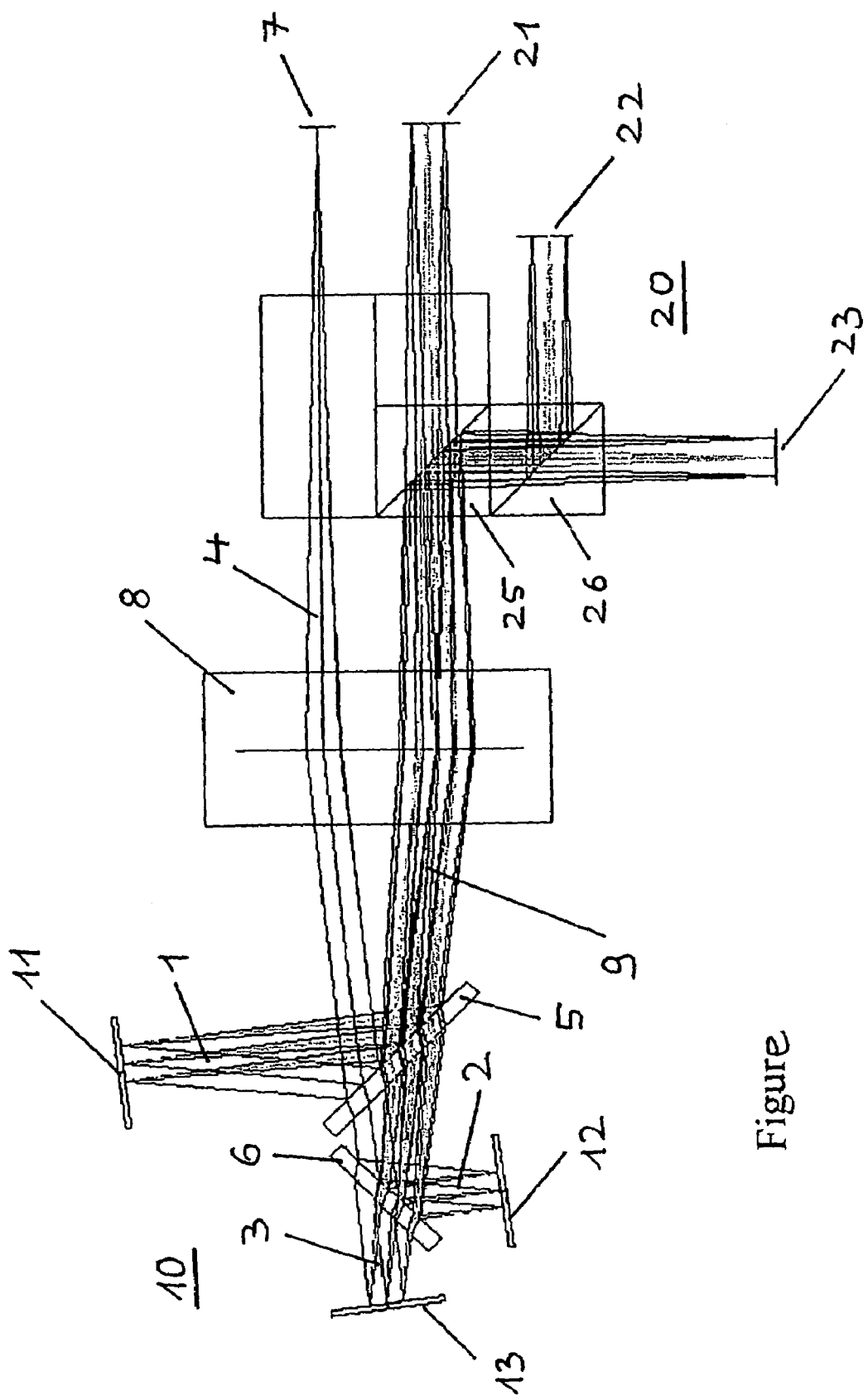
Figure

METHOD AND APPARATUS FOR DETECTING OPTICAL SPECTRA

This application claims the priority of German patent document 10 2004 026 373.6, filed May 29, 2004 (PCT International Application No. PCT/DE2005/000884, filed May 14, 2005), the disclosures of which are expressly incorporated by reference herein.

BACKGROUND AND SUMMARY OF THE INVENTION

The invention relates to a method and apparatus for detecting optical spectrums.

In principle, a spectrometer for detecting optical spectra consists of a diffraction device, by which an incident beam of the optical radiation that is to be examined is spectrally split, and a detection device which detects the radiation in a spectrally resolved manner. If the optical spectrum is to be detected over a broader spectral region, this usually cannot be accomplished without additional measures. Either individual spectrometers are used for different spectral regions or the different spectral regions are processed differently within the spectrometer.

In a spectrometer disclosed in U.S. Pat. No. 5,638,173, a diffraction device in the form of an optical grating is provided in the beam path of an incident beam. Two splitting filters and one deflection mirror are arranged in the beam path behind the diffraction grating, so that three partial beams are generated. The latter are assigned to three different spectral regions and are detected in a spatially separated manner, in a detector arrangement after passing through a joint spectrometer lens system. Because of the spatial separation of the partial beams, the spectrometer lens system must include large optical components (that is, large lenses) which leads to high weight and costs.

It is also known to provide "nosepieces" with different gratings in spectrometers, so that only one beam path needs be processed in the spectrometer lens system. However, as a result, the different spectral regions can be measured only sequentially (and not simultaneously) and, furthermore, an additional high-precision mechanism is required for changing the gratings.

One object of the present invention, therefore, is to provide a spectrometer which is small and lightweight, and which can process a large spectral region.

Another object of the invention is to provide a method for operating such a system.

These and other objects and advantages are achieved by the method according to the invention for detecting optical spectra, in which two or more partial beams generated from an incident beam and assigned to different spectral regions, travel through a joint spectrometer lens system and are detected in a spatially separated manner. The partial beams generated from the incident beam are directed to respective spatially separated diffraction gratings that are virtually superimposed in the beam path, and are assigned to the different spectral regions. After passing through the diffraction gratings, the partial beams are combined to a joint beam path traveling through the joint spectrometer lens system.

Preferably, the partial beams comprising the different spectral regions are spectrally separated after traveling through the joint spectrometer lens system, and are detected in detectors which are spatially separated and assigned to the different spectral regions.

According to a preferred embodiment of the method of the invention, it is provided that, when they are generated, the partial beams are spectrally separated from the incident beam.

Furthermore, it is preferably provided that the incident beam and the partial beams combined to the joint beam path, travel through the same spectrometer lens system. However, depending on the use, it may be advantageous for technical reasons to use separate spectrometer lens systems: that is, one spectrometer lens system for the incident beam and another one separated therefrom for the partial beams combined to the joint beam path.

According to a particularly preferred embodiment of the method according to the invention, it is provided that three spectrally separated partial beams are generated from the incident beam. The three beams are directed to three diffraction gratings virtually superimposed in the beam path and, after traveling through the joint spectrometer lens system, are detected in three detectors assigned to the respective spectral regions.

Furthermore, the invention also provides an arrangement for detecting optical spectra, which contains a diffraction device arranged in the beam path of an incident beam. A joint spectrometer lens system, is traversed by two or more partial beams which are generated from the incident beam and are assigned to different spectral regions; and a detector arrangement is provided for the spatially separate detection of the partial beams assigned to the different spectral regions. According to the invention, the diffraction device contains spatially separated diffraction gratings, which are assigned to the different spectral regions. A beam splitter device splits the incident beam into the respective partial beams directed to the diffraction gratings, and subsequently combines the partial beams to a joint beam path traveling through the joint spectrometer lens system in the sense of a virtual superimposition of the diffraction gratings.

The detector arrangement preferably contains respective detectors assigned to the different spectral regions. A spectral separating device spectrally separates the partial beams combined in the joint beam path, and directs them to the respective detectors.

According to a preferred embodiment of the invention, the beam splitter device splits the incident beam into the partial beams while spectrally separating them. Furthermore, it is preferably provided that the common spectrometer lens system is arranged in the beam path of the input beam and in the common beam path of the combined partial beams.

In a preferred embodiment of the arrangement according to the invention, the diffraction device contains three diffraction gratings that are virtually superimposed in the beam path, and the detector arrangement contains three detectors assigned to the respective spectral regions.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic view of the essential optical components and of the beam path of a spectrometer for detecting optical spectra, according to an embodiment of the invention.

DETAILED DESCRIPTION OF THE DRAWINGS

The FIGURE illustrates an arrangement (a spectrometer) for detecting optical spectra according to the invention. An incident beam of optical radiation 4, whose spectral composition is to be determined, enters through an entrance aperture 7. The incident beam 4 is directed to a diffraction device (which, in its entirety, has the reference number 10) through a spectrometer lens system 8 consisting of the corresponding lenses.

The diffraction device 10 comprises a first diffraction grating 11, a second diffraction grating 12 and a third diffraction grating 13 which are virtually superimposed by a beam splitter device containing a first beam splitter 5 and a second beam splitter 6 in the beam path of the incident beam 4. A partial beam 1, which consists of a portion of the incident beam 4, is directed by reflection to the first diffraction grating 11, while the remaining portion of the incident beam 4 reaches the second beam splitter 6 by transmission through the first beam splitter 5. The second beam splitter 6 reflects a second partial beam 2, directing it to the second diffraction grating 12, while the remainder of the incident beam 4 (a third partial beam 3) reaches the third diffraction grating 13 by transmission through the second beam splitter 6.

After diffraction, and the resulting spectral separation of the partial beams 1, 2, 3 by the respective diffraction gratings 11, 12, 13, the partial beams (now in a disperse form) are combined again by the beam splitters 5, 6 to form a joint beam path 9. This means that the partial beam 1 leaving the first diffraction grating 11 is directed by reflection at the first beam splitter 5 into the joint beam path 9; the second partial beam 2 coming from the second diffraction grating 12 is directed by reflection at the second beam splitter 6 to the first beam splitter 5 and, by transmission through the latter into the joint beam path 9; and the third partial beam 3 coming from the third diffraction grating 13 is directed by transmission through the second beam splitter 6 as well as through the first beam splitter 5 also in the joint beam path 9.

The partial beams 1, 2, 3 combined in the joint beam path 9 now jointly pass through the spectrometer lens system 8 and are imaged by the latter on a detector arrangement which, as a whole, has the reference number 20. The detector arrangement includes a first detector 21, a second detector 22 and a third detector 23. A first spectral splitter 25 and a second spectral splitter 26 are connected between the detectors 21, 22, 23 and the spectrometer lens system 8. While spectrally splitting the joint beam path 9, the first spectral splitter 25 allows a portion of the beam path 9 to pass through to the first detector 21, while the remaining portion is deflected to the second spectral splitter 26 by reflection. A portion of this remaining beam is, in turn, deflected by the second spectral splitter 26 by reflection to the second detector 22, while the remainder is permitted to pass through to the third director 23 by transmission.

The spectral transmission and reflection characteristics of the two spectral splitters 25, 26 are preferably selected such that a spectral region of the joint beam path 9 corresponding to the first, second and third partial beams 1-3, respectively reaches each of the detectors 21, 22, 23. In this manner, after passing through the spectrometer lens system 8, the partial beams 1, 2, 3 generated from the incident beam 4 by means of the beam splitters 5, 6, after passing through the diffraction gratings 11, 12, 13 virtually superimposed in the diffraction device 10, are detected in a spectrally separated manner in spatially separated detectors 21, 22, 23 assigned to the different spectral regions.

The beam splitters 5, 6, which generate the partial beams 1, 2, 3 from the incident beam 4, are preferably formed such that the partial beams 1, 2, 3 are already generated in them by a corresponding spectral separation from the incident beam 4. This means that the respective spectral regions of the individual partial beams 1, 2, 3 correspond essentially to the respective spectral regions of the of the beam regions directed to the individual detectors 21, 22, 23 by the spectral splitter device 25, 26.

For example, in this manner, the first partial beam processed at the first diffraction grating 11 can arrive at the first detector 21; the second partial beam 2 processed at the second diffraction grating 12 can arrive at the second detector 22; and the third partial beam 3 processed at the third diffraction grating 13 can arrive at the third detector 23. This takes place provided that the first partial beam 1 is reflected at the first beam splitter 5 and transmitted at the first spectral splitter 25; the second partial beam 2 is transmitted at the first beam splitter 5 and reflected at the second beam splitter 6 and is reflected at the first spectral splitter 25 as well as at the second spectral splitter 26; and that the third partial beam 3 is transmitted at both spectral splitters 5, 6 and reflected at the first spectral splitter 25 and transmitted at the second spectral splitter 26. In the case of a change of the construction, transmission and/or reflection characteristic of one or more of the beam splitter devices 5, 6 and/or of the spectral splitter devices 25, 26, the assignment of the individual partial beams 1, 2, 3 to the individual diffraction gratings 11, 12, 13 and the individual detectors 21, 22, 23 would be correspondingly different.

As illustrated in the FIGURE, the incident beam 4 and the partial beams 1, 2, 3 combined to the joint beam path 9 travel through the same spectrometer lens system 8, but in opposite directions. This means that the entrance aperture 7 is imaged by the spectrometer lens system 8 into infinity, where the virtually superimposed diffraction gratings 11, 12, 13 are situated. Thereafter, it is again is imaged by the spectrometer lens system 8 onto the detectors 21, 22, 23. In the illustrated embodiment, the entrance aperture 7 as well as the detectors 21, 22, 23 are therefore in each case situated in the focal point of the spectrometer lens system 8.

In the illustrated embodiment, the diffraction device 10 contains three diffraction gratings 11, 12, 13 virtually superimposed in the beam path, and the detector arrangement 20 also contains three detectors 21, 22, 23 which are assigned to the respective spectral regions. However, in other embodiments, it is possible to use only two, or four or more, of the diffraction gratings 11, 12, 13 and detectors 21, 22, 23.

Optical spectra which can be processed according to the invention are those which can be processed by means of optical components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of detecting optical spectra, said method comprising:
generating at least two partial beams from an incident beam, each of said partial beams being assigned to a different spectral region; and
passing said partial beams through a spectrometer lens system; and
detecting spatial information for each of said partial beams in a spatially separated manner; wherein
the partial beams generated from the incident beam are directed to respective spatially separated diffraction gratings that are virtually superimposed in the beam path and are assigned to the different spectral regions and after passing through the diffraction gratings, the partial beams are combined in a joint beam path traveling through the spectrometer lens system.

2. The method according to claim 1, wherein the partial beams comprising the different spectral regions are spectrally separated after passing through the spectrometer lens system and are detected in spatially separated detectors assigned to the different spectral regions.

3. The method according to claim 1, wherein the partial beams are spectrally separated from the incident beam when they are generated.

4. The method according to claim 1, wherein the incident beam and the partial beams combined in the joint beam path travel through the same spectrometer lens system.

5. The method according to claim 1, wherein:

three spectrally separated partial beams are generated from in the incident beam;

said partial beams are directed to three diffraction gratings that are virtually superimposed in the beam path; and after passing through the spectrometer lens system, the partial beams are detected in three detectors assigned to the respective spectral regions.

6. Apparatus for detecting optical spectra, comprising:

a diffraction device arranged in a beam path of an incident beam;

a spectrometer lens system, through which two or more partial beams travel, which beams comprise different spectral regions and are generated from the incident beam; and a detector arrangement for the spatially separated detection of the partial beams assigned to the different spectral regions; wherein the diffraction device contains, spatially separated diffraction gratings that are assigned to the different spectral regions and are virtually superimposed in the beam path; and a beam splitter device for splitting the incident beam into the respective partial beams that are directed to the diffraction gratings, and for subsequently combining the partial beams in a joint beam path traveling through the spectrometer lens system.

7. The apparatus according to claim 6, wherein the detector arrangement contains:

respective detectors assigned to the different special regions; and a spectral splitting device for spectral separation of the partial beam combined in the joint beam path and for directing the partial beams to the respective detectors.

8. The apparatus according to claim 6, wherein the beam splitter device is provided for splitting the input beam into the partial beams while spectrally separating the latter.

9. The apparatus according to claim 6, wherein the spectrometer lens system is arranged in the beam path of the input beam and in the joint beam path of the combined partial beams.

10. The apparatus according to claim 6, wherein:

the diffraction device contains three diffraction gratings that are virtually superimposed in the beam path; and the detector arrangement contains three detectors that are assigned to the respective spectral regions.

11. Apparatus for detecting spectral information regarding a beam of optical radiation, said apparatus comprising:

an aperture for forming an incident beam;

a plurality of diffraction devices for generating spectral information regarding a radiation beam directed thereon, said diffraction devices being spatially separated from one another, and virtually superimposed upon one another in the beam path, each being assigned to a different spectral region;

a beam splitting device which splits said incident beam into a plurality of spectrally separated partial beams, each assigned to a different spectral region, and for directing each of said partial beams to one of said diffraction devices that is assigned to the corresponding spectral region;

means for combining said partial beams in a joint beam path after diffraction by said diffraction devices; and a spectral separating arrangement that spectrally separate said partial beams, which are directed onto detectors assigned to the respective spectral regions;

wherein said incident beam and said joint beam path pass through the same spectrometer lens system, in opposite directions.

\* \* \* \* \*